(12) United States Patent
Spears

(10) Patent No.: US 9,297,942 B2
(45) Date of Patent: Mar. 29, 2016

(54) IMAGING WITH POLARIZATION REMOVAL

(71) Applicant: Hewlett-Packard Development Company, L.P., Houston, TX (US)

(72) Inventor: Kurt Eugene Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 13/651,391

(22) Filed: Oct. 13, 2012

(65) Prior Publication Data

US 2014/0104481 A1  Apr. 17, 2014

(51) Int. Cl.
*G03B 21/14*  (2006.01)
*G03B 21/26*  (2006.01)
*H04N 5/225*  (2006.01)
*G09G 5/02*  (2006.01)
*G02B 5/30*  (2006.01)
*G02B 5/28*  (2006.01)
*G02B 27/14*  (2006.01)
*G02B 27/12*  (2006.01)
*G06F 3/01*  (2006.01)
*H04N 9/31*  (2006.01)
*G06F 3/03*  (2006.01)
*G06F 3/0346*  (2013.01)

(52) U.S. Cl.
CPC *G02B 5/30* (2013.01); *G03B 21/14* (2013.01); *G03B 21/26* (2013.01); *G06F 3/017* (2013.01); *G06F 3/0304* (2013.01); *H04N 5/2254* (2013.01); *H04N 9/3194* (2013.01); *G06F 3/0346* (2013.01)

(58) Field of Classification Search
CPC ........ G03B 21/14; G03B 21/00; G03B 21/26; H04N 5/225; G09G 5/02; G02B 5/30; G02B 5/28; G02B 27/14; G02B 27/12; G02B 6/276
USPC ........... 353/20, 31, 34, 84; 348/342; 345/694; 359/483.01, 486.01, 582, 629, 639
See application file for complete search history.

(56) References Cited

U.S. PATENT DOCUMENTS

| 5,748,369 | A | * | 5/1998 | Yokota | 359/485.03 |
| 6,020,944 | A | * | 2/2000 | Hoshi | 349/62 |
| 7,023,536 | B2 | | 4/2006 | Zhang et al. | |
| 7,038,846 | B2 | | 5/2006 | Mandella et al. | |
| 7,088,440 | B2 | | 8/2006 | Buermann et al. | |
| 7,110,100 | B2 | | 9/2006 | Buermann et al. | |
| 7,113,270 | B2 | | 9/2006 | Buermann et al. | |
| 7,161,664 | B2 | | 1/2007 | Buermann et al. | |

(Continued)

OTHER PUBLICATIONS

Gao, Rui et al; Microsoft Research-Mobile Surface; Microsoft Research; 2010; http://research.microsoft.com/en-us/projects/mobilesurface/.

(Continued)

*Primary Examiner* — Sultan Chowdhury
*Assistant Examiner* — Magda Cruz
(74) *Attorney, Agent, or Firm* — HP Inc Legal Department

(57) ABSTRACT

An imaging system includes a projector, a camera and a filter set of polarization filters. The projector is to project light onto a surface. The camera is to capture light reflected from the surface. The filter set is to remove light of a first polarization from the projected light and to remove light of a non-first polarization from the reflected light so that the camera detects only reflected light having the first polarization.

20 Claims, 4 Drawing Sheets

(56) References Cited

U.S. PATENT DOCUMENTS

| | | | |
|---|---|---|---|
| 7,203,384 | B2 | 4/2007 | Carl et al. |
| 7,268,956 | B2 | 9/2007 | Mandella et al. |
| 7,474,809 | B2 | 1/2009 | Carl et al. |
| 7,599,561 | B2 | 10/2009 | Wilson et al. |
| 7,710,391 | B2 | 5/2010 | Bell et al. |
| 7,729,515 | B2 | 6/2010 | Mandella et al. |
| 7,826,641 | B2 | 11/2010 | Mandella et al. |
| 7,845,802 | B2 | 12/2010 | Ikeda et al. |
| 7,961,909 | B2 | 6/2011 | Mandella et al. |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 2005/0078092 | A1 | 4/2005 | Clapper |
| 2005/0168437 | A1 | 8/2005 | Carl et al. |
| 2008/0018591 | A1 | 1/2008 | Pittel et al. |
| 2008/0079872 | A1* | 4/2008 | Yamauchi et al. ............ 349/97 |
| 2010/0225887 | A1* | 9/2010 | Sato et al. ..................... 353/31 |
| 2010/0296060 | A1* | 11/2010 | Huang .......................... 353/20 |
| 2011/0227915 | A1 | 9/2011 | Mandella et al. |
| 2011/0241986 | A1 | 10/2011 | Feng et al. |
| 2011/0242054 | A1 | 10/2011 | Tsu |
| 2011/0279743 | A1 | 11/2011 | Kuroda |
| 2012/0038549 | A1 | 2/2012 | Mandella et al. |
| 2012/0076353 | A1* | 3/2012 | Large .................... G03B 17/54 |
| | | | 382/103 |
| 2013/0077236 | A1 | 3/2013 | Becze et al. |
| 2013/0194418 | A1 | 8/2013 | Gonzalez-Banos et al. |

OTHER PUBLICATIONS

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts, CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen+Touch=New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Junuzovic, Sasa et al; Microsoft Research-IliumiShare; Microsoft Research; 2012; http://delivery.acm.org/10.1145/2210000/2208333/p1919-junuzovic.pdf?ip=15.219.153.76&id=2208333&acc=ACTIVE%20SERVICE&key=C2716FEBFA981EF153FE223D54A46A411F9E1F05F1DA6F38&CFID=271558808&CFTOKEN=98334302&_acm_=1387226323_00af7aa5e159c7c67d724c49ef01bacf.

Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

Melanson, Donald; Wiimote Repurposed for Multi-Point interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions on, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using a Depth Camera as a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

Astre, B. et al; Automatic Calibration of a Single-projector Catadioptric Display System; http://nguyendangbinh.org/Proceedings/CVPR/2008/data/papers/448.pdf > on pp. 1-8.

Fujii, K. et al; A Projector-camera System with Real-time Photometric Adaptation for Dynamic Environments; http://www1.cs.columbia.edu/CAVE/publications/pdfs/Fujii_CVPR05.pdf.

Shahram Izadi et al., "C-Slate: A Multi-Touch and Object Recognition System for Remote Collaboration using Horizontal Surfaces," Second Annual IEEE International Workshop on Horizontal Interactive Human-Computer System, 2007, pp. 3-10, IEEE.

* cited by examiner

IMAGING WITH POLARIZATION REMOVAL

BACKGROUND

Collaborative environments can allow users who are remote with respect to each other to collaborate on a common virtual object. For example, each user can have a copy of a digital image of an object, e.g., a document. Each copy of the digital image can be input to a respective projector for projecting respective identical visible images with which the respective users can interact. For example, user gestures can be interpreted as document annotations.

The projected visible images and interactions can be captured using respective cameras. The copies of the digital image can be updated based on the captured images and interactions. For example, a digital document image can be updated with annotations added. Copies of the updated digital document image can be input to the respective projectors to update the respective visible images. Thus, remote users can interact with copies of a virtual document or other object much as co-located users might work on a physical object.

BRIEF DESCRIPTION OF THE DRAWINGS

The following figures represent examples and not the invention itself.

DETAILED DESCRIPTION

Figure 1:
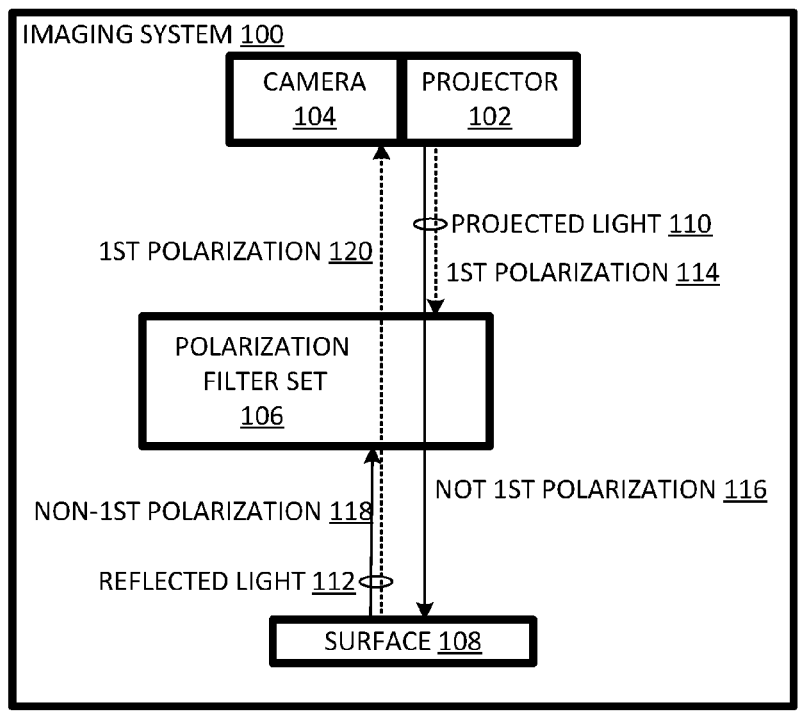
FIG. 1 is a schematic diagram of an imaging system in accordance with an example.

A projection capture system, e.g., for use in a mixed reality system, can include a projector and a camera. The projector is to illuminate physical objects and to project images, e.g., to support virtual objects. To avoid glare due to specular reflections in the captured images, the camera and projector are shifted from the center of the capture and display areas. Such an offset can make an imaging system undesirably broad and top heavy. Furthermore, some sort of image compensation is required to address distortion in projected and captured images due to the off-center illumination and capture. Examples presented herein avoid specular glare without the compromise involved in moving the projector and camera off center.

An imaging system 100 includes a projector 102, a camera 104, and a polarization filter set 106 of at least one polarization filter. Projector 102 is to project (projected) light 110 onto a surface 108, while camera 104 is to capture (reflected) light 112 reflected from surface 108. Polarization filter set 106 is to remove light having a first polarization from projected light 110 so that only not-first polarized projected light (i.e., light that is polarized with a polarization other than said first polarization) is incident surface 108. Polarization filter set 106 is also to remove light not having said first polarization from reflected light 112 so that camera 104 captures only reflected light of said first polarization. In some variations, projector 102 and polarization filter set 106 do not share any polarizing filters, while in other variations they share one or more polarizing filters.

Reflected light 112 can include both diffuse reflections and specular reflections (that can appear as undesirable glare in a captured image). Specular reflections are polarization-preserving, while diffuse reflections are not. Since only non-first polarized light is incident surface 108, all specular reflections must have non-first polarization. However, filter set 106 removes non-first polarized components from the reflected light. Therefore, no specular reflections reach camera 104 so that glare-free images are produced despite the locations of projector 102 and camera being nearly centered above surface 108.

Figure 2:
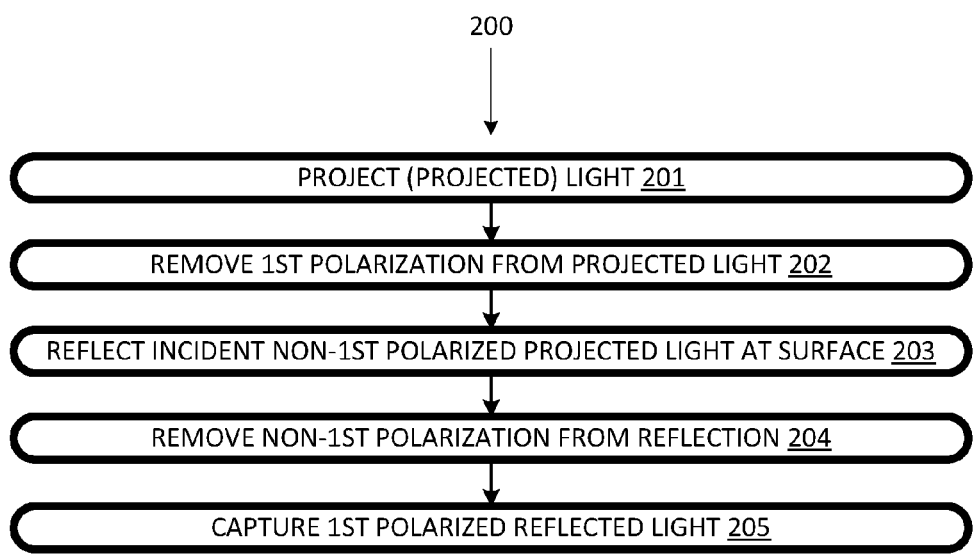
FIG. 2 is a flow chart of an imaging process in accordance with an example.
Figure 3:
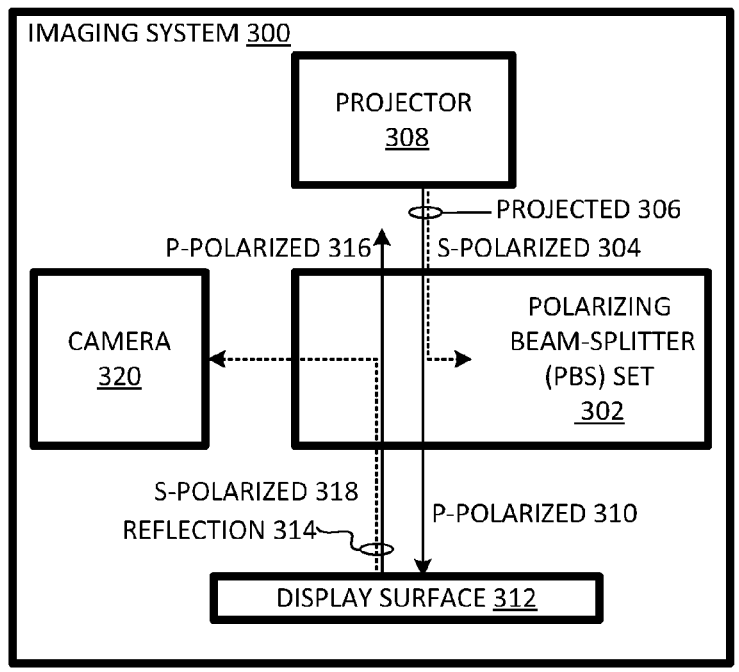
FIG. 3 is a schematic diagram of an imaging system that uses a polarizing beam splitter (PBS) as a polarization filter in accordance with an example.

A process 200 that can be implemented using imaging system 100 or another imaging system is flow charted in FIG. 2. At 201, projected light is projected. At 202, light of a first polarization is removed from the projected light so that only non-first polarized projected light is incident a surface. At 203, reflection of the incident light yields reflected light. At 204, non-first polarized light is removed from the reflected light so that only reflected light of the first polarization is incident a camera. At 205, the reflected light of the first polarization is captured with the camera. As with imaging system 100, imaging process 200 provides for camera images that are free of glare that otherwise might be caused by specular reflections.

Herein, a "polarization filter" is a device that removes a polarization component from light incident the device, while allowing another polarization component to continue transmission along a path, where a path can be straight or include bends, e.g., at points of reflection. Thus, the term "polarization filter" encompasses devices that selectively transmit one polarization over another (e.g., a polarizing film), selectively reflect one polarization over another (e.g., as liquid-crystal-on-silicon LCOS devices do), or transmit one polarization while reflecting another (e.g. using a polarizing beam splitter or "PBS"). In the case of a PBS, if the path of interest is the path through a PBS, then S-polarized light is filtered from the incident light, leaving the P-polarized light to continue along the path. If the path of interest is in the direction of the reflection, then the PBS removes the P-polarized light from the incident light, allowing the S-polarized light to continue transmitting along the path.

An imaging system 300 uses a PBS set 302 as a polarization filter set to remove S-polarized light 304 from projected light 306 projected by a projector 308 so that only P-polarized projected light 310 is incident a display surface 312. A reflection 314 of P-polarized projected light 310 can include diffuse-reflection components and specular reflection components. Since specular reflections preserve polarization, the specular components of reflection 314 are P-polarized only.

Since diffuse reflections are not polarization preserving, diffuse components of reflection 314 can include both P-polarized light and S-polarized light. Thus, P-polarized light 316 of reflection 314 contains both specular and diffuse reflection components, while S-polarized light 318 contains only diffuse reflection components. PBS set 302 transmits P-polarized reflected light 316 so that it bypasses a camera 320, while reflecting only S-polarized reflected light 318 toward camera 320. Thus, only diffuse reflections are captured by camera 320 to the exclusion of the specular reflections carried by P-polarized reflected light 316. In this way, an image captured by camera 320 can be free of specular glare.

In imaging system 300, the light path of interest is from projector 308 to camera 320 via PBS set 302 and surface 312.

Since PBS set 302 reflects the S-polarized reflected light 318, projector 308 and camera 320 can, in effect, share an ideal optical axis without having to be co-located. Thus, both projector 308 and camera 320 can be optically centered with respect to surface 312 and yet images can be captured that are free of specular glare.

Figure 4:
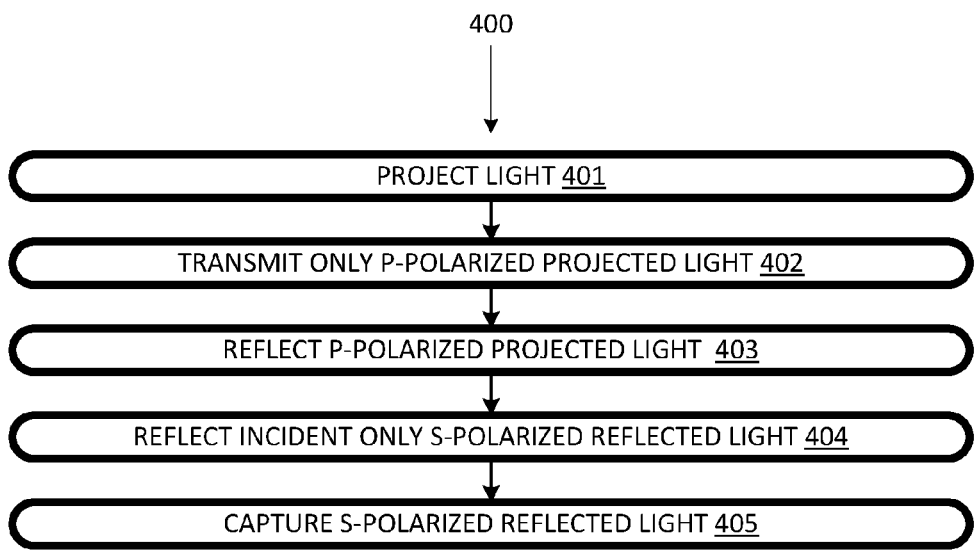
FIG. 4 is a flow chart of an imaging process that filters P-polarized and S-polarized light in accordance with an example.

A process 400, flow-charted in FIG. 4, can be implemented using imaging system 300 or another imaging system. At 401, (non-polarized) light is projected. At 402, S-polarized light is removed from the projected light by reflecting it out of a path through a PBS. As a result, the remaining projected light is P-polarized.

At 403, the P-polarized projected light is reflected at a surface, yielding reflected light that can contain both diffuse reflections and specular reflections. At 404, P-polarized light and, thus, specular reflections are removed from the reflected light by allowing the P-polarized reflected light to transmit through a PBS, while S-polarized reflected light proceeds along a path, e.g., toward a camera. At 405, the S-polarized light is captured, to the exclusion of the P-polarized light and, thus, the specular reflections.

In other examples, the roles of the S-polarized light and the P-polarized light are reversed. In other words, the S-polarized light is incident the display surface, and the camera captures P-polarized light. Those skilled in the art can rearrange the elements of imaging system 300 to effect such a switch. In other examples, different types of polarized light, e.g., circularly or elliptically polarized light of different chirality or handedness can be separated by filtering.

In some examples, a single bi-directional PBS is used both to remove S-polarized light from the projected light and to remove P-polarized light from the reflected light. For example, in one variation of imaging system 300, PBS set 302 consists of a single PBS. In an example detailed further below, separate PBSs are used for 1) removing S-polarized light from projected light, and 2) removing P-polarized light from reflected light.

An imaging system 500 includes a projector 502, a camera 504, a display surface 506, a PBS 508, and a combination projector/camera lens 510. Projector 502 includes an S-polarized illumination source 512, a liquid-crystal on silicon (LCOS) projection panel 514, and a PBS 516. PBS 508 and PBS 516 collectively constitute a polarizing filter set.

Figure 6:
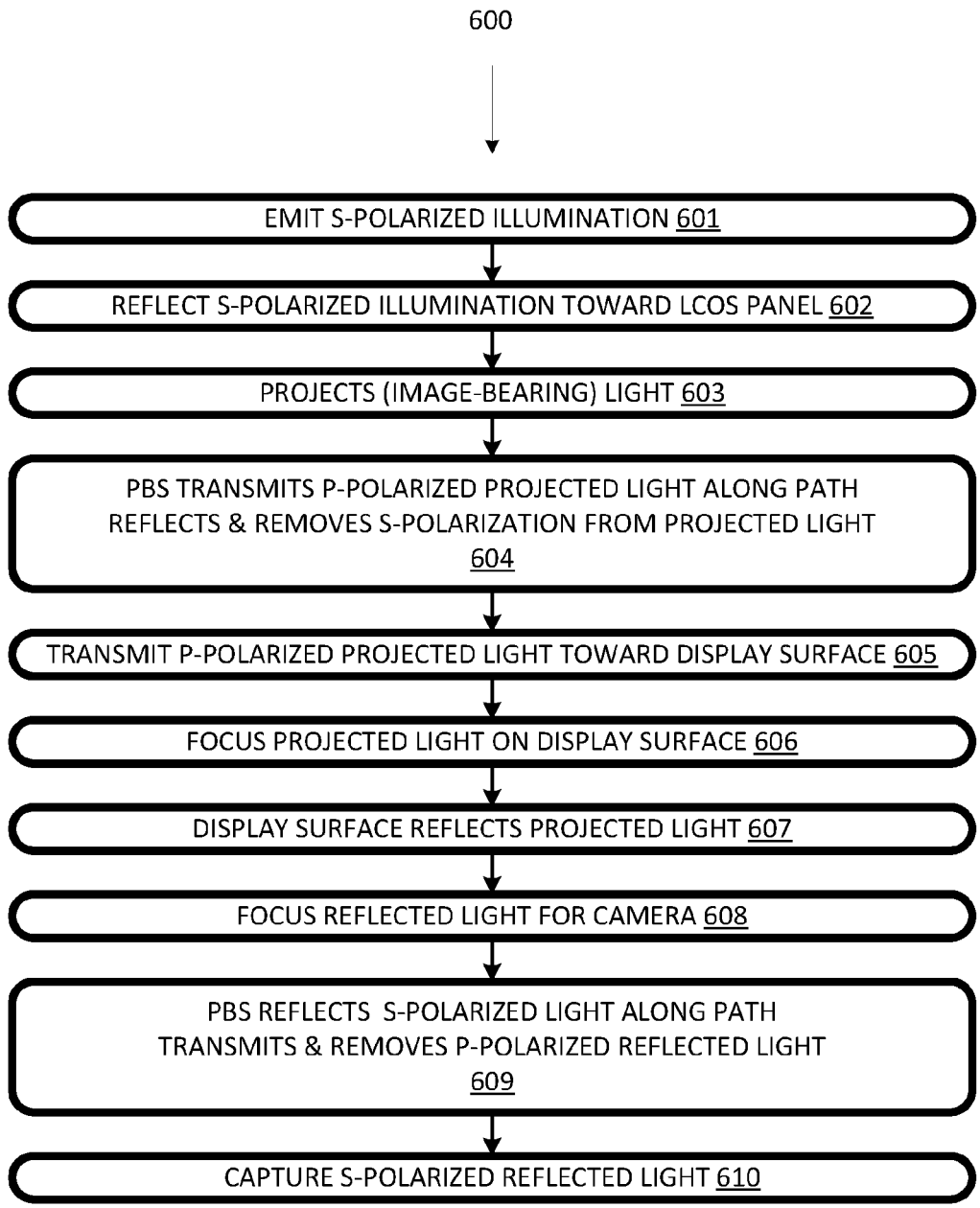
FIG. 6 is a flow chart of a method that uses PBSs as polarization filters in accordance with an example.

Imaging system 500 may be operated according to a method 600, flow charted in FIG. 6. At 601, illumination source emits "emitted" S-polarized illumination 518. For example, red, green, and blue S-polarized light can be emitted in a color-sequential repeating RGB pattern to provide "white" illumination on a time-averaged basis.

At 602, PBS 516 reflects the S-polarized illumination toward LCOS projection panel 514 to yield reflected S-polarized illumination 520. At 603, LCOS projection panel 514 reflects illumination toward display surface 506 to yield projected light 522. Typically, LCOS projection panel 514 imposes an image on projected light 522. Projected light 522 can include S-polarized light 524 and P-polarized light 526.

At 604, PBS 516 reflects S-polarized light 524 so as to remove it from projected light 522. Downstream of PBS 516, projected light 522 includes only P-polarized projected light 526. Herein, the terms "upstream", "downstream", and "between" are interpreted in the context of a path extending from a projector to a camera (with an intervening reflection at a display surface). "Upstream" refers to portions of a path closer (as measured along the path) to the projector, while "downstream" refers to portions of a path closer (as measured along the path) to the camera.

At 605, P-polarized projected light 526 is transmitted through PBS 508 to display surface 506. Since the projected light no longer contains S-polarized light, there is no reflection of projected light at PBS 508. At 606, P-polarized projected light 526 is focused, e.g., by projector/camera lens 510 on display surface 506.

At 607, display surface 506 reflects incident light to yield reflected light 530. Reflected light 530 includes both S-polarized reflected light 532 and P-polarized reflected light 534. To the extent there are specular reflections, they are included in P-polarized reflected light 534 and absent from S-polarized reflected light 532. Reflected light 530 can be image bearing: 1) bearing an image derived from an image born by projected light 522; or bearing an image of a physical object near display surface 506 illuminated by P-polarized projected light 526. At 608, projector/camera lens 510 focuses reflected light 530 to focus an image born by reflected light 530 at a distance associated with a sensor of camera 504.

At 609, PBS 508 reflects S-polarized reflected light 332 toward camera 504, while transmitting P-polarized reflected light 334, effectively removing P-polarized reflected light from the path to camera 504. As a result, any specular reflections from the reflection at display surface 506 are removed from the path to camera 504.

At 610, camera 504 captures S-polarized light 332, including any image born by S-polarized light 332. The resulting image is free of any glare due to the reflection at display surface 506, any such glare having been removed by PBS 508 at 609. In the case that the light emitted at 601 is emitted on a color-sequential basis, camera 504 can capture separate red, green, and blue separations, which can be combined into a full-color image either within camera 504 or separately.

Figure 5:
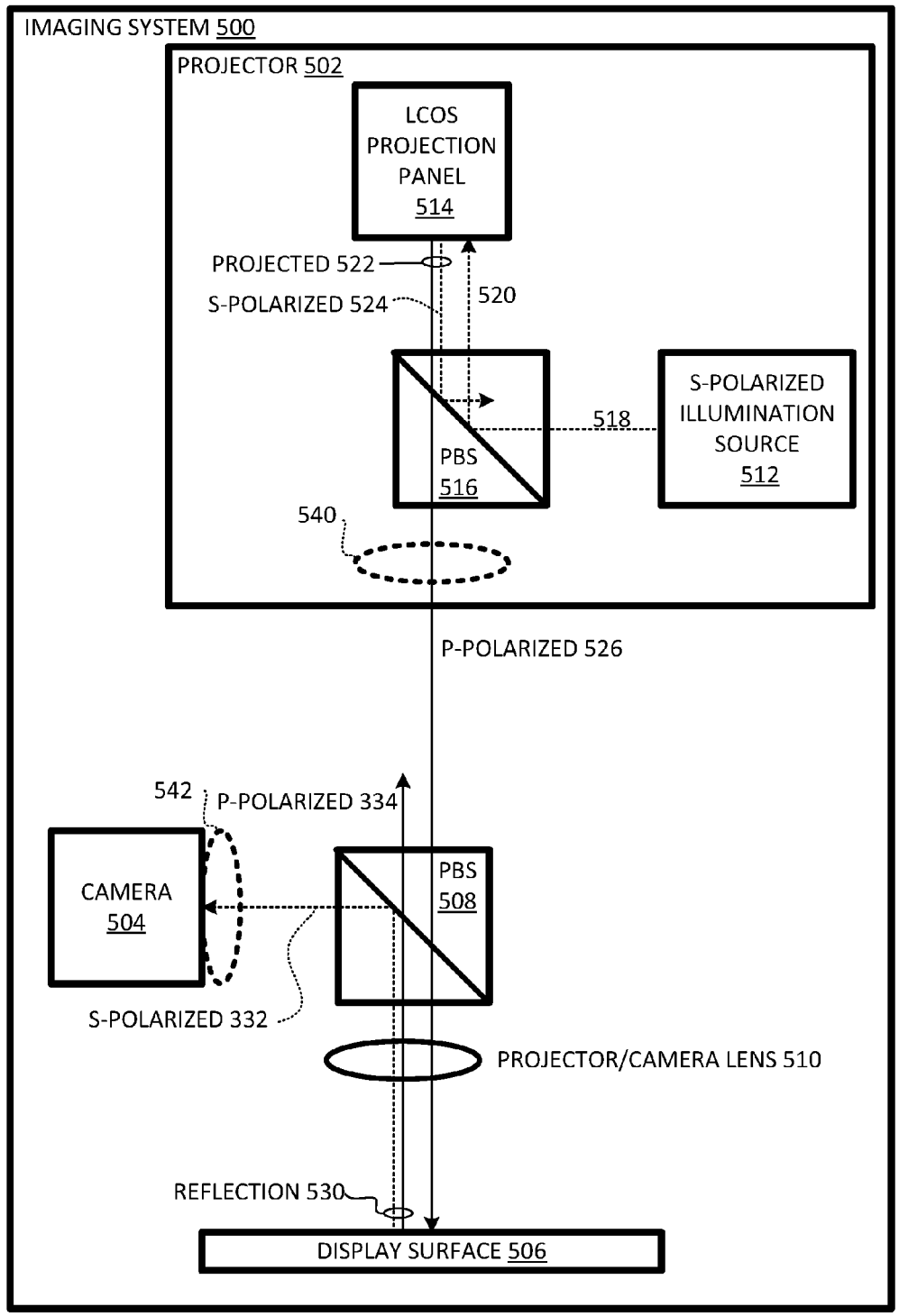
FIG. 5 is a schematic diagram of an imaging system with two PBSs in accordance with an example.

In variations of imaging system 500, an imaging system uses separate projector and camera lenses, e.g., respectively at 540 and 542 in FIG. 5. Depending on the variation, these dedicated lenses can be used instead of or in addition to a projector/camera lens (such as lens 510). Associated variations of imaging process 600 would change the position of and possibly the number of focusing actions in the process. In other variations of imaging system 500, a single PBS is used both to remove S-polarization from projected light and to remove P-polarization from reflected light.

Herein, a "system" is a set of interacting non-transitory tangible elements, wherein the elements can be, by way of example and not of limitation, mechanical components, electrical elements, atoms, physical encodings of instructions, and process actions. An "imaging system" is a system to generate, project, manipulate, and/or capture an image.

Herein, "process" refers to a sequence of actions resulting in or involving a physical transformation. "Imaging process" refers to a process of generating, projecting, manipulating, and/or capturing a visible image or information representing a visible image.

Herein, unless otherwise apparent from context, "image" refers to a visible (i.e., human perceptible) spatial distribution of light. However, "image" can also refer to information corresponding to a visible image, even where that information is not visible to the human eye. For example, "digital image" refers to a computer-readable representation of a visible image.

Herein, "light" encompasses visible and invisible (e.g., infrared) electromagnetic radiations. Light may be image bearing or non-image bearing, e.g. uniform for the purpose of illuminating an image to be captured. "Projecting light" means generating and transmitting light. "Projector" is defined broadly herein as a device or system for generating and transmitting light, which may or may not be image bearing. In the case of LCOS and LCD projectors, the LCOS reflectors and the LCD filters are considered elements of a polarization filter set as they separate one polarization from another. Thus, in some cases, it is a projector may emit image-bearing light; in other cases, a polarization filter may impose an image on previously non-imaging-bearing light.

Some projectors project full-color images, while color-sequential projectors project one-color at a time, e.g., red, green, and blue, in sequence. In the case of a color-sequential projector, the camera can be synchronized with the projector to capture separate color, e.g., red, green, and blue separations to be combined within the camera or externally.

Herein, a "polarization filter" is a device for removing light of a first polarization from non-polarized or mixed-polarized light so that only light of a second polarization (opposite the first polarization) continues along a light path. In the case that a polarizing beam splitter is used as a polarizing filter, the light path can be either the path through the PBS or the path along the reflection by the PBS. In some cases, a polarization filter, e.g., a LCOS or LCD array, can impose an image on previously non-image-bearing light. Herein, "non-first polarized light" is polarized light having a polarization opposite to or different from a first polarization.

In this specification, related art is discussed for expository purposes. Related art labeled "prior art", if any, is admitted prior art. Related art not labeled "prior art" is not admitted prior art. In the claims, "said" introduces elements for which there is explicit verbatim antecedent basis; "the" introduces elements for which the antecedent basis may be implicit. The illustrated and other described embodiments, as well as modifications thereto and variations thereupon are within the scope of the following claims.

What is claimed is:

1. An imaging system comprising:
   a projector to project projected light onto a display surface;
   a camera to capture reflected light reflected from said display surface;
   a filter set of a plurality of polarization filters to:
      remove light of a first polarization from said projected light so that only light not of said first polarization is incident said display surface, said display surface to, in response to said light incident on said display surface, reflect said reflected light comprising a diffuse reflection component caused by a diffuse reflection from said display surface, and
      remove light not of said first polarization from said reflected light so that said camera detects only light of said first polarization; and
   a camera lens and a projector lens, said camera lens being positioned downstream of said polarization filters so that said camera lens receives only reflected light of said first polarization, and said projector lens being located between said polarization filters.

2. The imaging system as recited in claim 1 wherein each polarization filter of said filter set is selected from the group consisting of polarizing films and polarizing beam splitters (PBSs).

3. The imaging system as recited in claim 1 wherein said first polarization is S-polarization.

4. The imaging system as recited in claim 1, wherein said removing light of said first polarization comprises removing light of S-polarization, and wherein said removing light not of said first polarization comprises removing P- polarization light.

5. The imaging system as recited in claim 1, wherein said diffuse reflection component is non-polarization preserving and comprises light of said first polarization and light not of said first polarization.

6. The imaging system as recited in claim 5, wherein said reflected light further comprises a specular reflection component that is polarization preserving and comprises only light not of said first polarization.

7. An imaging process comprising:
   projecting projected light;
   removing first polarization light of a first polarization from said projected light to yield non-first-polarized projected light;
   reflecting said non-first-polarized projected light to yield reflected light comprising a diffuse reflection component;
   removing non-first-polarization light from said reflected light to yield first-polarized reflected light having said first polarization; and
   capturing said first-polarized reflected light.

8. The imaging process as recited in claim 4 wherein said first polarization is S-polarization or P-polarization.

9. The imaging process as recited in claim 8 wherein said removing first polarization light includes using first polarizing films or a first polarizing beam splitter (PBS) to remove said first polarization light.

10. The imaging process as recited in claim 6 wherein said removing non-first-polarization light includes using said first PBS to remove said non-first-polarization light.

11. The imaging process as recited in claim 9 wherein said removing non-first-polarization light includes using a second PBS to remove said non-first-polarization light, said second PBS being separate from said first PBS.

12. The imaging process as recited in claim 9 further comprising using said first PBS to reflect S-polarized illumination toward a liquid-crystal-on-silicon LCOS panel to yield said projected light.

13. The imaging process as recited in claim 7 further comprising focusing said reflected light while said reflected light includes P-polarized light, wherein said first polarization is P-polarization.

14. The imaging process as recited in claim 7 further comprising focusing said reflected light after P-polarized light has been removed from said reflected light, wherein said first polarization is P-polarization.

15. The imaging process as recited in claim 7, wherein said removing first polarization light from said projected light comprises removing S-polarization light, and wherein said removing non-first-polarization light from said reflected light comprises removing P-polarization light.

16. The imaging process as recited in claim 7, wherein said diffuse reflection component is non-polarization preserving and comprises first polarization light and non-first-polarization light.

17. The imaging process as recited in claim 16, wherein said reflected light further comprises a specular reflection component that is polarization preserving and comprises only non-first-polarization light.

18. An imaging system comprising:
   a projector to project projected light comprising first polarized light of a first polarization and second polarized light of a second polarization;
   a camera;
   a filter set of a plurality of polarization filters to:
      filter said first polarized light from said projected light to cause filtered projected light comprising said second polarized light without the first polarized light to be incident on a display surface, said display surface to, in response to said filtered projected light, reflect reflected light comprising a diffuse reflection component caused by a diffuse reflection from said display surface, and filter reflected polarized light of said second polarization from said reflected light to cause filtered reflected light comprising reflected light of said first polarization without said reflected light of said second polarization to be incident on said camera, wherein said camera is to capture said filtered reflected light.

19. The imaging process as recited in claim 18, wherein said first polarization is S-polarization, and said second polarization is P-polarization.

20. The imaging process as recited in claim 18, wherein said first polarization is P-polarization, and said second polarization is S-polarization.

* * * * *